(12) United States Patent
Hidaka et al.

(10) Patent No.: US 11,121,600 B2
(45) Date of Patent: Sep. 14, 2021

(54) MOTOR AND BLOWER

(71) Applicant: Nidec Corporation, Kyoto (JP)

(72) Inventors: Hidehiko Hidaka, Kyoto (JP); Yuji Saiki, Kyoto (JP); Tomoyuki Tanaka, Kyoto (JP); Tomohiro Koguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 145 days.

(21) Appl. No.: 16/656,885

(22) Filed: Oct. 18, 2019

(65) Prior Publication Data
US 2020/0144884 A1 May 7, 2020

(30) Foreign Application Priority Data
Nov. 7, 2018 (JP) .............................. JP2018-209805

(51) Int. Cl.
| *H02K 11/33* | (2016.01) |
|---|---|
| *H02K 3/52* | (2006.01) |
| *H02K 5/16* | (2006.01) |
| *H02K 5/24* | (2006.01) |
| *H02K 7/08* | (2006.01) |

(Continued)

(52) U.S. Cl.
CPC .............. *H02K 3/522* (2013.01); *F04D 25/06* (2013.01); *H02K 5/165* (2013.01); *H02K 5/24* (2013.01); *H02K 7/086* (2013.01); *H02K 7/14* (2013.01); *H02K 11/30* (2016.01); *H02K 21/22* (2013.01);

(Continued)

(58) Field of Classification Search
CPC ........... H02K 3/52; H02K 21/22; H02K 5/16; H02K 5/24; H02K 7/08; H02K 7/14; H02K 5/1675; H02K 5/165; H02K 1/187; H02K 7/086; H02K 3/522; H02K 2203/03; H02K 2203/12; H02K 2203/06; F04D 25/06; F04D 25/0646; F04D 25/0633

See application file for complete search history.

(56) References Cited

U.S. PATENT DOCUMENTS

| 3,636,393 A * | 1/1972 | Pieper .................... H02K 3/522 |
|---|---|---|
| | | 310/71 |
| 2006/0138886 A1* | 6/2006 | Ito .......................... H02K 3/522 |
| | | 310/89 |

(Continued)

FOREIGN PATENT DOCUMENTS

| CN | 201222665 Y | 4/2009 |
|---|---|---|
| JP | 11-252867 A | 9/1999 |

(Continued)

*Primary Examiner* — Naishadh N Desai
(74) *Attorney, Agent, or Firm* — Keating & Bennett, LLP

(57) ABSTRACT

A motor includes a stationary portion, a rotating portion, and a bearing portion. The rotating portion includes a shaft that rotates about a central axis extending vertically. The stationary portion includes a bearing housing, a stator, and a circuit board. The circuit board is above the stator and includes an insertion hole that permits insertion of the bearing housing. The stator includes a stator core, an insulator, a coil, and a terminal pin. The terminal pin is connected to a conductive wire and connected to the circuit board via a solder portion covered with a coating layer. The insulator includes a base portion and a wall portion. The wall portion protrudes upward from the base portion, is radially outward of the bearing housing, and contacts a radially inner surface of the circuit board at the insertion hole.

12 Claims, 8 Drawing Sheets

(51) Int. Cl.
*H02K 7/14* (2006.01)
*F04D 25/06* (2006.01)
*H02K 21/22* (2006.01)
*H02K 11/30* (2016.01)

(52) U.S. Cl.
CPC ..... *H02K 2203/03* (2013.01); *H02K 2203/06* (2013.01); *H02K 2203/12* (2013.01)

(56) References Cited

U.S. PATENT DOCUMENTS

2007/0007834 A1* 1/2007 Teshima .............. F04D 25/0646
 310/71
2017/0288509 A1* 10/2017 Oya ........................ F24F 11/89

FOREIGN PATENT DOCUMENTS

| | | |
|---|---|---|
| JP | 2001-327109 A | 11/2001 |
| JP | 2011-160522 A | 8/2011 |
| JP | 2013-188091 A | 9/2013 |

* cited by examiner

MOTOR AND BLOWER

CROSS REFERENCE TO RELATED APPLICATION

The present application claims priority under 35 U.S.C. § 119 to Japanese Application No. 2018-209805 filed on Nov. 7, 2018, the entire contents of which are hereby incorporated herein by reference.

FIELD OF THE INVENTION

The present disclosure relates to a motor and a blower.

BACKGROUND

A conventional motor includes a teeth core (stator core), a winding bobbin (insulator), a winding wire, and a printed circuit board (circuit board). The winding bobbin is fitted to a teeth portion of the teeth core. The winding wire is wound around the teeth portion through the winding bobbin and connected to the printed circuit board.

An insertion hole for a shaft forming a motor shaft is provided in a center portion of the teeth core. The printed circuit board has an insertion hole into which a shaft support member is inserted in a center portion, and contacts an upper end of the winding bobbin radially outward of the insertion hole.

Normally, the shaft is supported by a bearing held by the support member, and the support member is press-fitted into the insertion hole of the teeth core. Further, a coating agent may be applied to a circuit on an upper surface of the printed circuit board for moisture prevention or the like.

At this time, according to the motor, when the coating agent is applied to the printed circuit board, the coating agent may flow into a radially inner surface of the teeth core through the insertion hole. For this reason, when the support member is fixed to the radially inner surface of the teeth core, the position accuracy of a motor shaft may deteriorate due to the inclination or eccentricity of the shaft caused by the adhesion of the coating agent.

SUMMARY

A motor according to an example embodiment of the present disclosure includes a stationary portion, a rotating portion, and a bearing portion. The rotating portion includes a shaft that rotates about a central axis extending vertically. The bearing portion rotatably supports the shaft with respect to the stationary portion. The stationary portion includes a bearing housing, a stator, and a circuit board. The bearing housing has a cylindrical shape that holds the bearing portion. The stator is radially outward of the bearing housing. The circuit board is above the stator and includes an insertion hole allowing insertion the bearing housing. The stator includes a stator core, an insulator, a coil, and a terminal pin. The stator core includes an annular core back and a plurality of teeth extending radially outward from the core back and disposed in a circumferential direction. The insulator covers at least a portion of the stator core. On the coil, a conductive wire is wound around the teeth with the insulator interposed therebetween. The terminal pin is connected to the conductive wire, passes through a through-hole in the circuit board to protrude above the circuit board, and is connected to the circuit board via a solder portion covered with a coating layer. The insulator includes a base portion and a wall portion. The base portion covers at least a portion of an upper portion of the stator core. The wall portion protrudes upward from the base portion, is disposed radially outward of the bearing housing, and contacts a radially inner surface of the circuit board at the insertion hole. The wall portion opposes the solder portion in a radial direction. A width in a circumferential direction of the wall portion is larger than a width in a circumferential direction of the solder portion. An upper end of the wall portion is positioned axially above an upper surface of the circuit board.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present application will be described with reference to the drawings. Note that, in the present application, a direction parallel to the central axis of a motor is referred to as an "axial direction", a direction orthogonal to the central axis of the motor is referred to as a "radial direction", and a direction along the arc about the central axis of the motor as the center is referred to as a "circumferential direction". Further, in the present application, a shape and a positional relationship of each part will be described by setting the axial direction as a vertical direction, and setting a circuit board side on an upper side with respect to a stator core. Note that the vertical direction is simply a name used for explanation, and does not limit the actual positional relationship and direction.

Further, the "parallel direction" in the present application includes a substantially parallel direction. Further, the "orthogonal direction" in the present application includes a substantially orthogonal direction.

Figure 1:
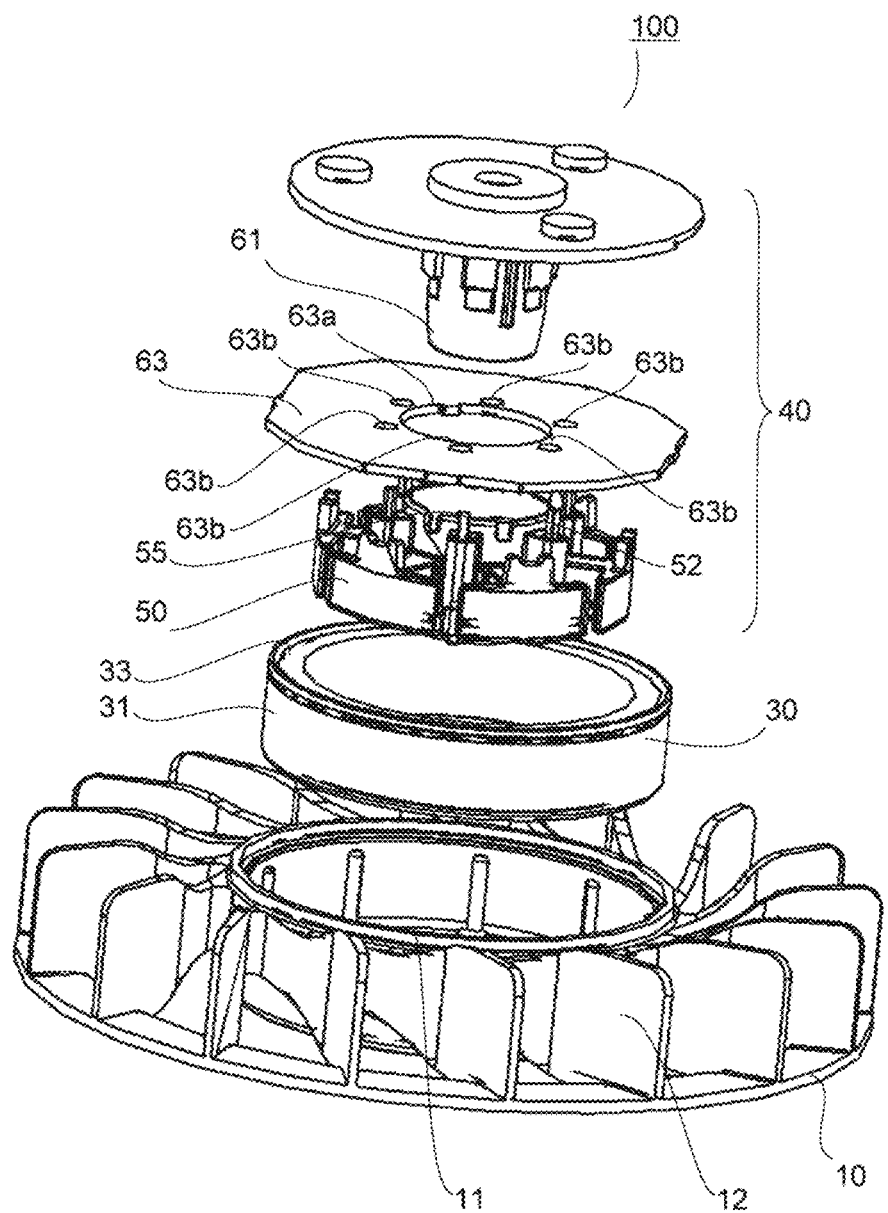
FIG. 1 is an exploded perspective view of a blower according to a first example embodiment of the present disclosure.
Figure 2:
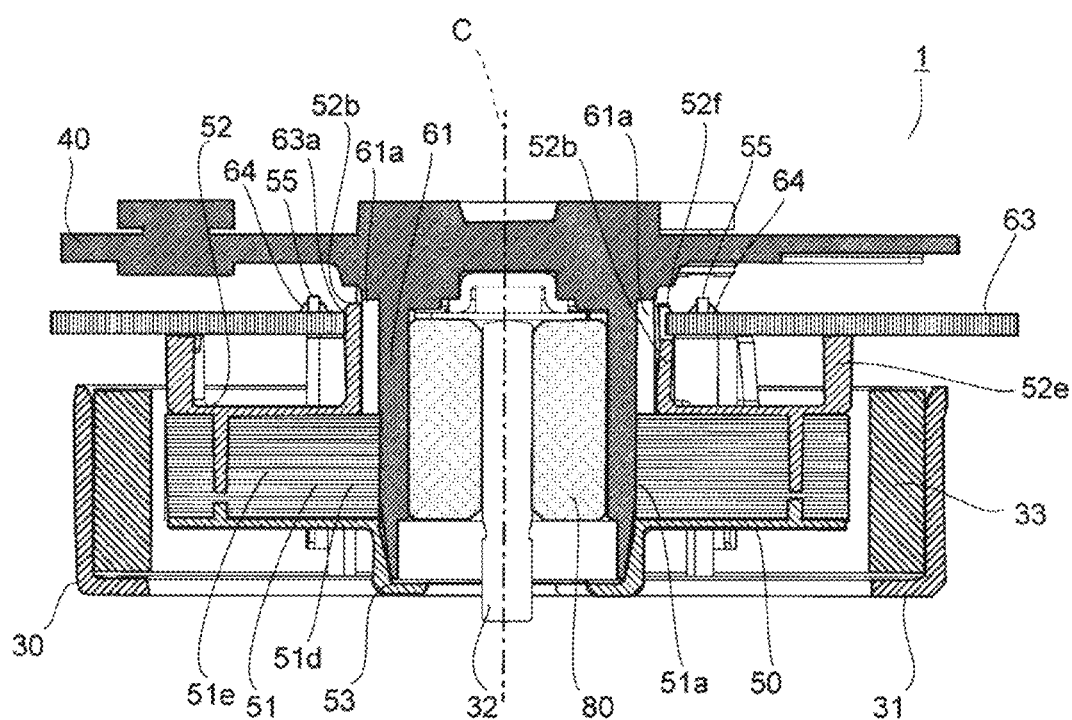
FIG. 2 is a longitudinal cross-sectional view of a motor according to the first example embodiment of the present disclosure.
Figure 3:
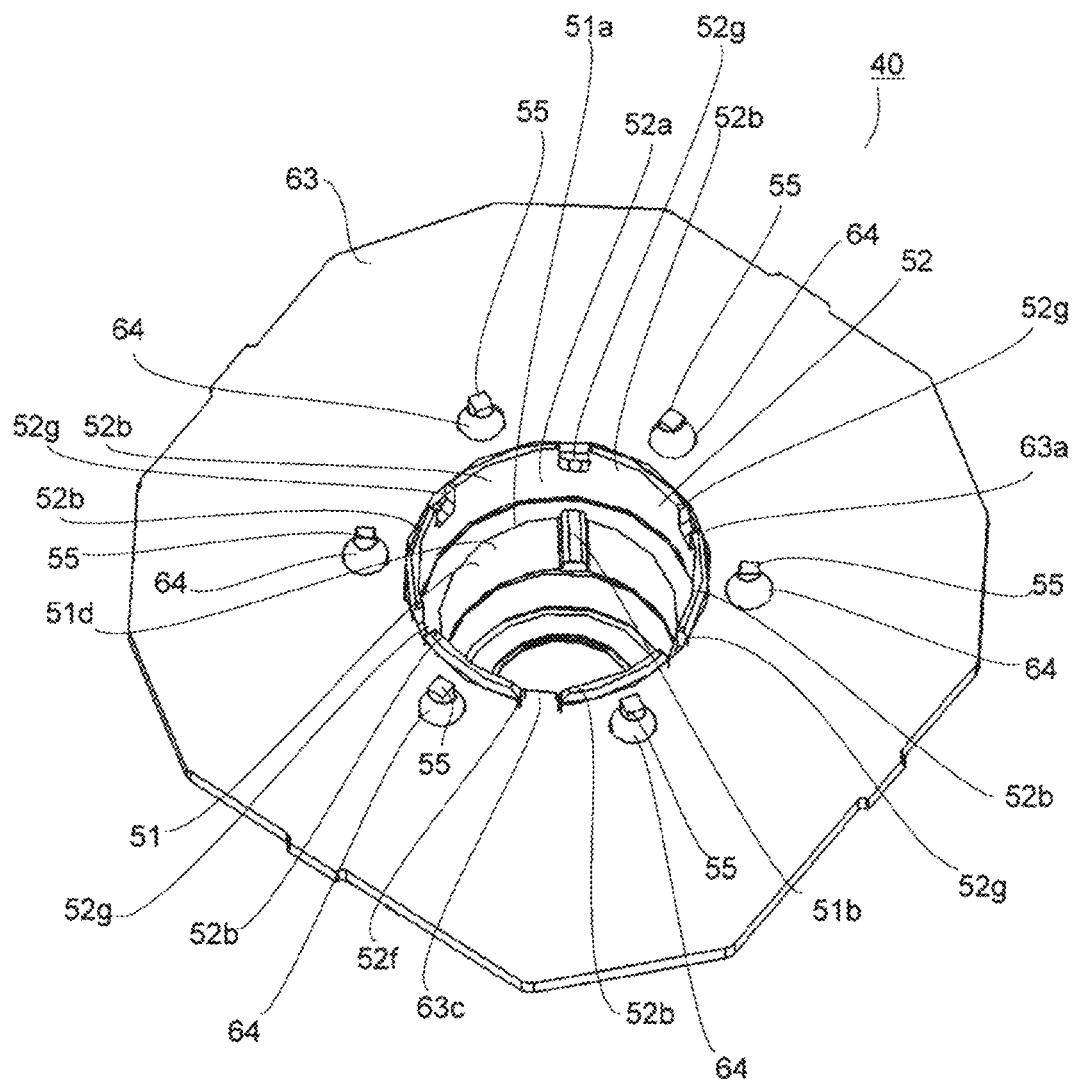
FIG. 3 is a perspective view of a stationary portion of the motor according to the first example embodiment of the present disclosure.

A blower according to an example embodiment of the present disclosure will be described. FIG. 1 is an exploded perspective view of a blower 100 according to the example embodiment of the present disclosure, and FIG. 2 is a longitudinal cross-sectional perspective view of a motor 1 of the blower 100. FIG. 3 is a perspective view of a stationary portion 40 and shows a state before a bearing housing 61 is fixed to a stator 50.

The blower 100 includes the motor 1 and an impeller 10. The impeller 10 includes a cylindrical cup part 11 whose upper surface is open and a blade 12. The cup part 11 and the blade 12 are integrally formed of resin. The cup part 11 accommodates a rotor holder 31 to be described later in the inside and is fixed to the motor 1. When the motor 1 is driven, the impeller 10 rotates about a central axis C.

The motor 1 includes the stationary portion 40, a rotating portion 30, and a bearing portion 80. The rotating portion 30 has a shaft 32 that forms a motor shaft. The shaft 32 rotates around the central axis C that extends vertically. The bearing portion 80 rotatably supports the shaft 32 with respect to the stationary portion 40.

The stationary portion 40 includes the bearing housing 61, the stator 50, and a circuit board 63. The bearing housing 61 holds the bearing portion 80 and is formed into a cylindrical shape. The stator 50 is disposed on a radially outward of the bearing housing 61. The circuit board 63 is disposed above the stator 50 and has an insertion hole 63a into which the bearing housing 61 is inserted or press-fitted.

The stator 50 includes a stator core 51, insulators 52 and 53, a coil (not shown), and a terminal pin 55.

The stator core 51 is made from an annular laminated steel plate. The stator core 51 has a core back 51d and teeth 51e. The core back 51d is formed into an annular shape having an insertion hole 51a on the central axis C. A plurality of the teeth 51e extend radially outward from the core back 51d and are disposed in the circumferential direction. For example, the number of the teeth 51e in the present example embodiment is six.

The insulators 52 and 53 are made from an insulating resin molded product. The insulator 52 is disposed above the stator core 51, and the insulator 53 is disposed below the stator core 51. The insulators 52 and 53 cover an upper surface, a lower surface, and a circumferential side surface of the teeth 51e (see FIG. 5). Note that a detailed configuration of the insulators 52 and 53 will be described later.

The coil (not shown) is formed by winding a conductive wire (not shown) above the insulator 52 and below the insulator 53. By the insulators 52 and 53, the stator core 51 and the conductive wire are insulated.

The terminal pins 55 are disposed between adjacent ones of the teeth 51e, and are provided at, for example, six locations. A lower end portion of the terminal pin 55 is connected to the conductive wire. An upper end portion of the terminal pin 55 passes through a through-hole 63b formed in the circuit board 63 in the axial direction and protrudes upward from the circuit board 63. The upper end portion of the terminal pin 55 is connected to the circuit board 63 via a solder portion 64. The solder portion 64 is covered with a coating layer 65 (see FIG. 6) including a coating agent.

The circuit board 63 has an insertion hole 63a and a through-hole 63b. The through-holes 63b are arranged radially outward of the insertion hole 63a and are provided at six locations. The through-holes 63b are disposed at equal intervals in the circumferential direction.

The bearing housing 61 is formed into a cylindrical shape, and is press-fitted into the insertion hole 51a of the stator 50 from the insertion hole 63a. The bearing housing 61 holds the bearing portion 80 in its inside. For the bearing portion 80, for example, a sleeve bearing mechanism is used. Note that, as the bearing portion 80, two ball bearings may be used.

The rotating portion 30 includes a rotor holder 31, a shaft 32, and a magnet 33. The shaft 32 is a columnar metal member that forms a rotating shaft extending along the central axis C, is inserted into the bearing housing 61, and is rotatably supported by the bearing portion 80.

The rotor holder 31 has a covered cylindrical shape, and has a magnet 33 fixed to an inner peripheral surface. The magnet 33 is disposed radially outward of the stator core 51, and torque is generated between the stator 50 and the magnet 33, so that the motor 1 is driven.

Figure 4:
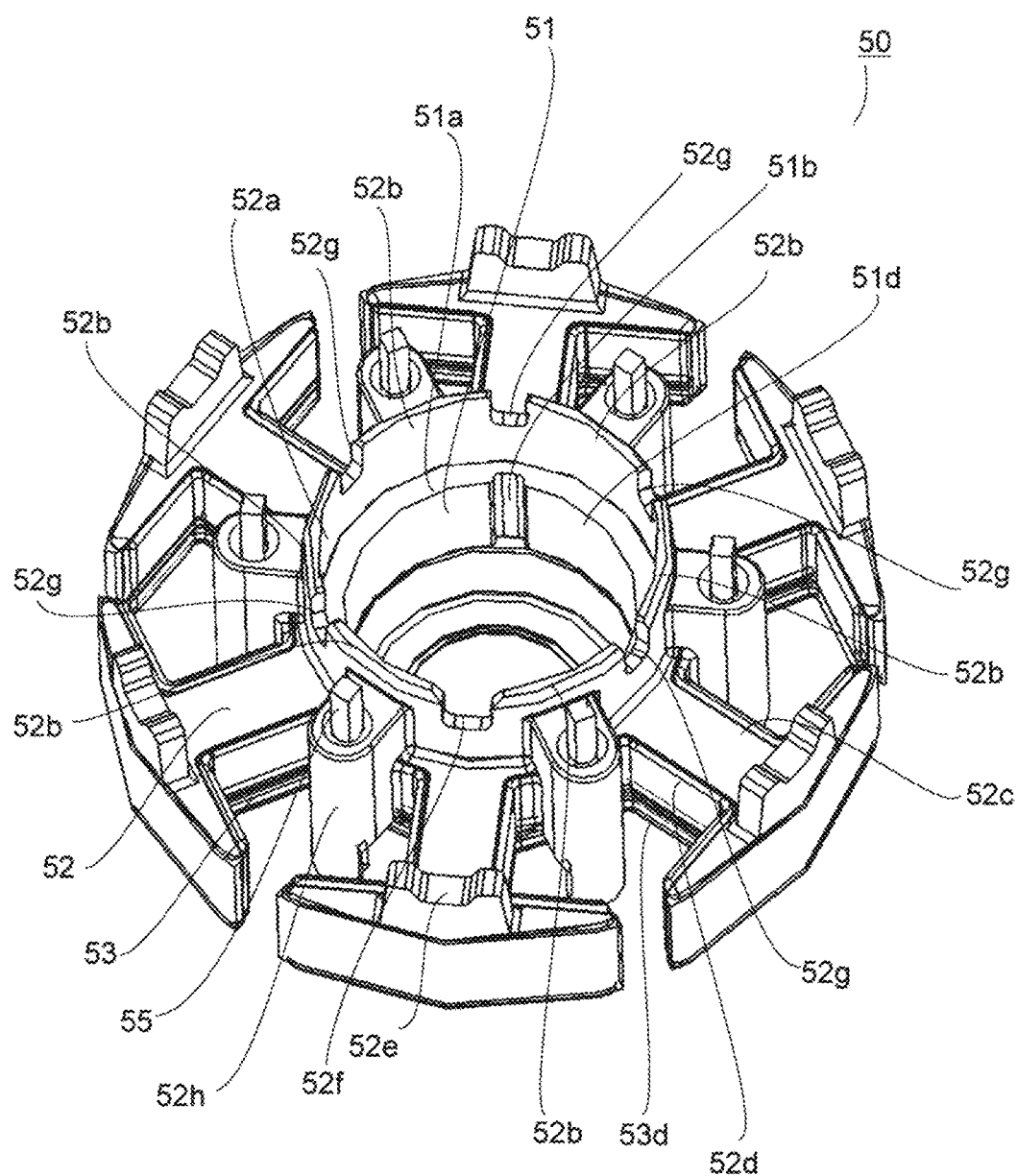
FIG. 4 is a perspective view of a stator of the motor according to the first example embodiment of the present disclosure.
Figure 5:
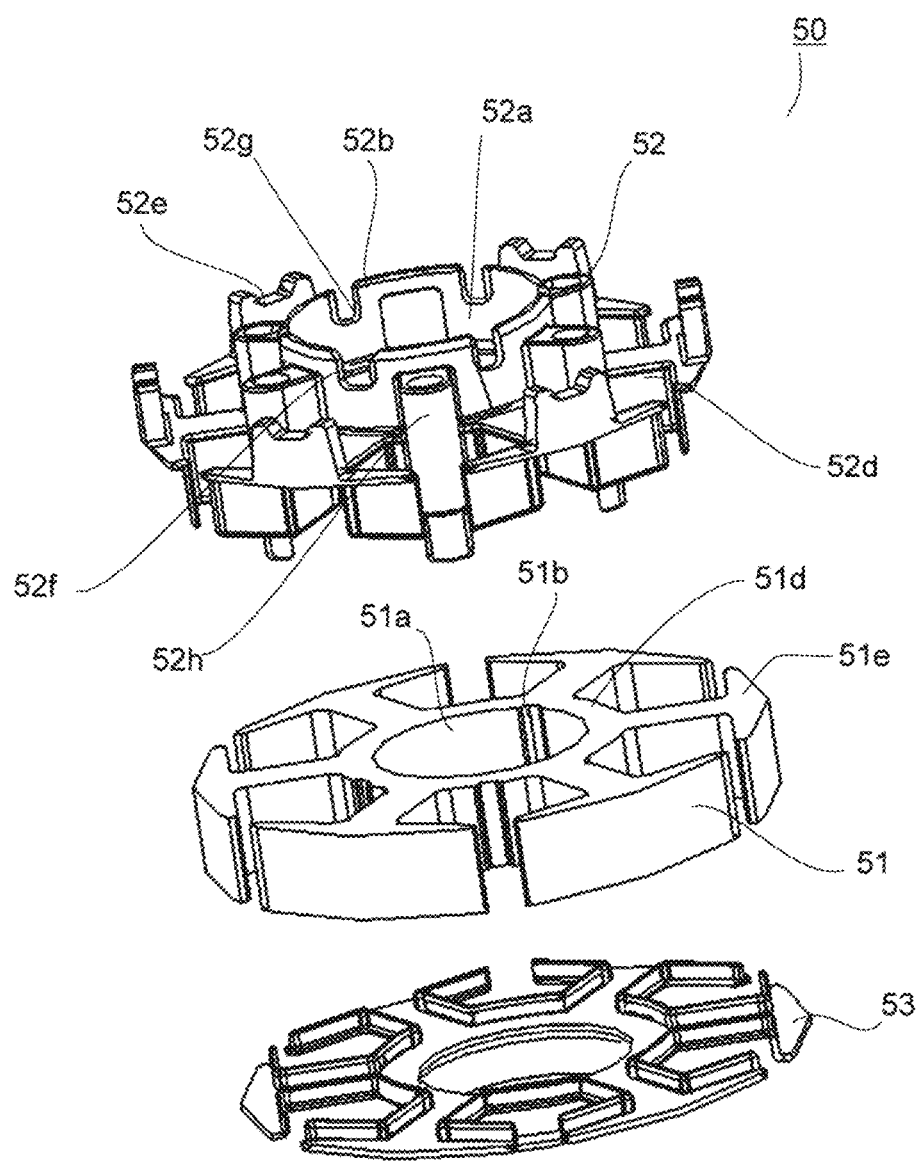
FIG. 5 is an exploded perspective view of the stator of the motor according to the first example embodiment of the present disclosure.
Figure 6:
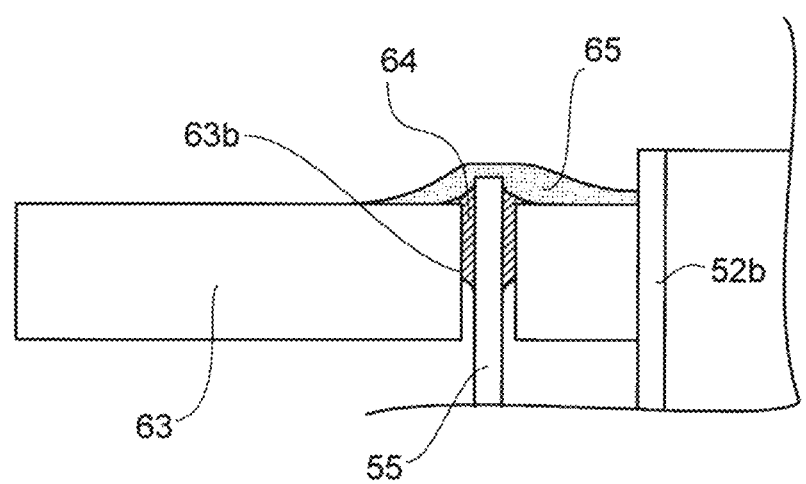
FIG. 6 is a longitudinal cross-sectional view schematically showing the vicinity of a terminal pin of the motor according to the first example embodiment of the present disclosure.

FIG. 4 is a perspective view of the stator 50, which is shown without a conductive wire. FIG. 5 is an exploded perspective view of the stator 50, which is shown without a conductive wire or the terminal pin 55. FIG. 6 is a longitudinal cross-sectional view schematically showing the vicinity of the terminal pin 55.

The insulator 52 includes a base portion 52a and a wall portion 52b. The base portion 52a includes an upper surface cover portion 52c, a side surface cover portion 52d, a protruding portion 52e, and a terminal guide portion 52h. The base portion 52a contacts with an upper surface of the stator core 51 in the axial direction while avoiding an inner edge portion of the upper surface of the stator core 51.

A plurality of the upper surface cover portions 52c are arranged in the circumferential direction, have inner circumferential ends connected, and extend in the radial direction. Each of the upper surface cover portions 52c contacts an upper surface of each of the teeth 51e. The side surface cover portion 52d extends downward from a side edge portion of the upper surface cover portion 52c and contacts a circumferential side surface of the teeth 51e. The protruding portion 52e protrudes upward from an outer edge portion of the upper surface of each of the upper surface cover portions 52c. An upper end portion of the protruding portion 52e contacts a lower surface of the circuit board 63 and supports the circuit board 63. However, the circuit board 63 does not need to be in contact with the protruding portion 52e.

The terminal guide portion 52h is formed into a cylindrical shape extending in the axial direction, and is disposed between adjacent ones of the upper surface cover portions 52c. Further, the terminal guide portion 52h is disposed closer to a radially inner side than a central portion between an inner end and an outer end in the radial direction of the teeth 51e. The terminal pin 55 is inserted through the terminal guide portion 52h, and an upper end portion of the terminal pin 55 protrudes upward in the axial direction from an upper end portion of the terminal guide portion 52h. The terminal pin 55 and the stator core 51 are insulated by the terminal guide portion 52h.

The wall portion 52b protrudes upward from an inner edge portion of the upper surface of the base portion 52a. In a state where the bearing housing 61 is fixed to the stator 50, the wall portion 52b is disposed radially outward of the bearing housing 61, and contacts a radially inner surface of the insertion hole 63a of the circuit board 63 in the radial direction. That is, the insulator 52 includes the base portion 52a that covers at least part of an upper portion of the stator core 51, and the wall portion 52b that protrudes upward from the base portion 52a, is disposed radially outward of the bearing housing 61, and contacts a radially inner surface of the insertion hole 63a of the circuit board 63.

The wall portion 52b has a notch portion 52g that is recessed downward in the axial direction. The notch portions 52g are disposed at, for example, six locations at equal intervals in the circumferential direction. In this manner, an upper portion of the wall portion 52b is divided into six portions in the circumferential direction. Further, one of the notch portions 52g (hereinafter may be referred to as the "notch portion 52f") has a larger width in the circumferential direction than the other five. The wall portion 52b is inserted into the insertion hole 63a, and a board projecting portion 63c of the circuit board 63 described later engages with the notch portion 52f.

An upper portion of the wall portion 52b is divided into a plurality of portions in the circumferential direction, and so that the wall portion 52b is bent in the radial direction. For this reason, workability at the time of engaging the circuit board 63 with the wall portion 52b is improved. Note that the number of the divided upper portions of the wall portion 52b is the same as the number of the terminal pins 55, and a width in the circumferential direction of each of the wall portions 52b can be sufficiently secured.

After the terminal pin 55 is soldered to the circuit board 63, an upper surface of the circuit board 63 is covered with a coating layer 65 having moisture resistance (see FIG. 6). At this time, an upper surface of the solder portion 64 is also covered with the coating layer 65. The coating layer 65 is formed by applying a liquid coating agent and then drying the agent. Note that the coating agent may have other physical properties, such as electromagnetic wave shielding property, in addition to moisture resistance.

The wall portion 52b faces the solder portion 64 in the radial direction, and a width in the circumferential direction of the wall portion 52b is larger than a width in the circumferential direction of the solder portion 64. Further, the upper end of the wall portion 52b is positioned axially above an upper surface of the circuit board 63. In this manner, when a liquid coating agent is applied to the upper surface of the circuit board 63, the coating agent is blocked by the wall portion 52b and is less likely to flow into the insertion hole 63a. For this reason, the coating agent can be prevented from adhering to an inner peripheral surface of the insertion hole 51a of the stator core 51. Therefore, when the bearing housing 61 is fixed to the stator 50, the bearing housing 61 can be prevented from being inclined with respect to the stator 50. Furthermore, the inclination or eccentricity of the shaft 32 held by the bearing housing 61 can be prevented. That is, the inflow of the coating agent from the circuit board 63 to the radially inner surface of the stator core 51 can be suppressed, and the position accuracy of the motor shaft of the motor 1 can be improved.

Note that the coating agent has a certain fluidity. The solder portion 64 protrudes upward from the upper surface of the circuit board 63. For this reason, the coating agent applied on the solder portion 64 flows away from the center of the solder portion 64. Therefore, the thickness of the coating layer 65 that covers a peripheral portion of the solder portion 64 is larger than the thickness of the coating layer 65 that covers the central portion of the solder portion 64. More specifically, a thickness in the axial direction of the coating layer 65 covering the peripheral portion of the solder portion 64 is larger than a thickness in the axial direction of the coating layer 65 covering the central portion of the solder portion 64.

The circuit board 63 has at least one of the board projecting portion 63c that protrudes radially inward from the radially inner surface in the insertion hole 63a (see FIG. 3). The board projecting portion 63c is fitted in the notch portion 52f in the radial direction and has a larger width in the circumferential direction than the other notch portions 52g. In this manner, the circuit board 63 can be easily positioned in the circumferential direction with respect to the stator 50. Further, with the board projecting portion 63c provided on the circuit board 63, an area of the circuit board 63 can be widened and a circuit pattern can be easily formed.

The radially inner end of the board projecting portion 63c is disposed at the same position or outer side in the radial direction of the radially inner surface of the wall portion 52b. For this reason, an protrusion amount of the board projecting portion 63c is reduced, and a radially inner end portion of the board projecting portion 63c is positioned away from the insertion hole 51a in the radial direction. That is, the axial drop point of the coating agent is separated radially outward from the inner peripheral surface of the stator 50. In this manner, adhesion of the coating agent to the inner peripheral surface of the stator core 51 can be suppressed. Further, since the board projecting portion 63c is fitted to the notch portion 52f in the radial direction, the circuit board 63 can be easily positioned in the circumferential direction with respect to the stator 50.

The lower end of the notch portion 52f is positioned below the lower surface of the circuit board 63 in the axial direction (see FIG. 2). In this manner, a gap is formed in the axial direction between the lower end of the notch portion 52f and the lower surface of the board projecting portion 63c. For this reason, the board projecting portion 63c is fitted to the notch portion 52f without contacting the lower surface of the notch portion 52f. Therefore, rattling can be prevented from occurring between the insulator 52 and the circuit board 63.

Figure 7:
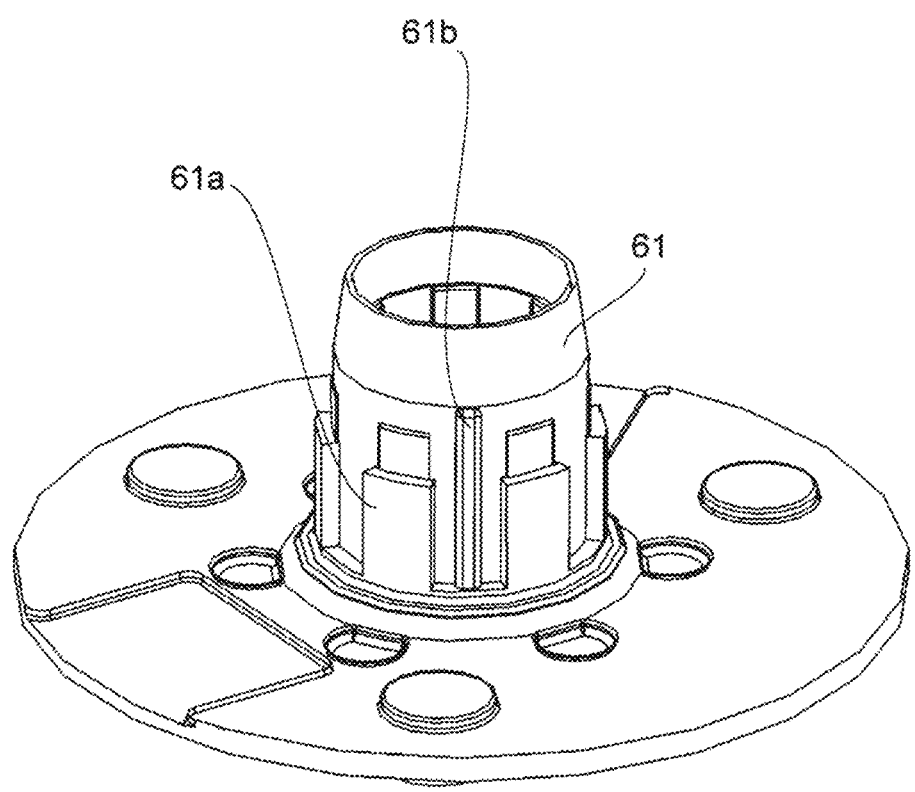
FIG. 7 is a perspective view of a bearing housing of the motor according to the first example embodiment of the present disclosure viewed from below.

FIG. 7 is a perspective view of the bearing housing 61 as viewed from below. The bearing housing 61 includes a support portion 61a and a housing projecting portion 61b that protrude radially outward from the radially outer surface. For example, the support portions 61a are provided at six locations and are disposed at equal intervals in the circumferential direction.

The bearing housing 61 is fixed to the stator 50 (see FIG. 3) in a state where the terminal pins 55 are soldered to the circuit board 63. At this time, the axially lower surface of the support portion 61a contacts an upper surface of the core back 51d in the axial direction. More specifically, the axially lower surface of the support portion 61a contacts the inner edge portion of the upper surface of the core back 51d that is not covered with the insulator 52 (see FIG. 2). In this manner, the stator 50 is positioned in the axial direction with respect to the bearing housing 61.

In a state where the bearing housing 61 is fixed to the stator 50, the radially outer surface of the support portion 61a at least partially contacts the radially inner surface of the wall portion 52b. Accordingly, the wall portion 52b is supported in the radial direction by the support portion 61a. This prevents the wall portion 52b from being inclined radially inward. Accordingly, a gap is less likely to be formed between the radially outer surface of the wall portion 52b and the radially inner surface of the insertion hole 63a of the circuit board 63, and the coating agent can be prevented from flowing into this gap.

The housing projecting portion 61b is provided, for example, at one location between adjacent ones of the support portions 61a. Further, the core back 51d has a stator recess 51b that is located on the radially inner side of the teeth 51e and is recessed radially outward from the radially inner surface of the core back 51d (see FIG. 3). The housing projecting portion 61b is fitted into the stator recess 51b in the radial direction. In this manner, the stator 50 is easily positioned in the circumferential direction with respect to the bearing housing 61.

Note that the stator recess 51b is provided at least at one place, and is disposed on the radial extension of the teeth 51e. Specifically, the stator recess 51b is disposed on an inner side of a pair of extension lines extending in the radial direction from both sides in the circumferential direction of the teeth 51e in a top view. This can reduce the narrowing of a magnetic path formed in the circumferential direction on the core back 51d by the stator recess 51b.

Figure 8:
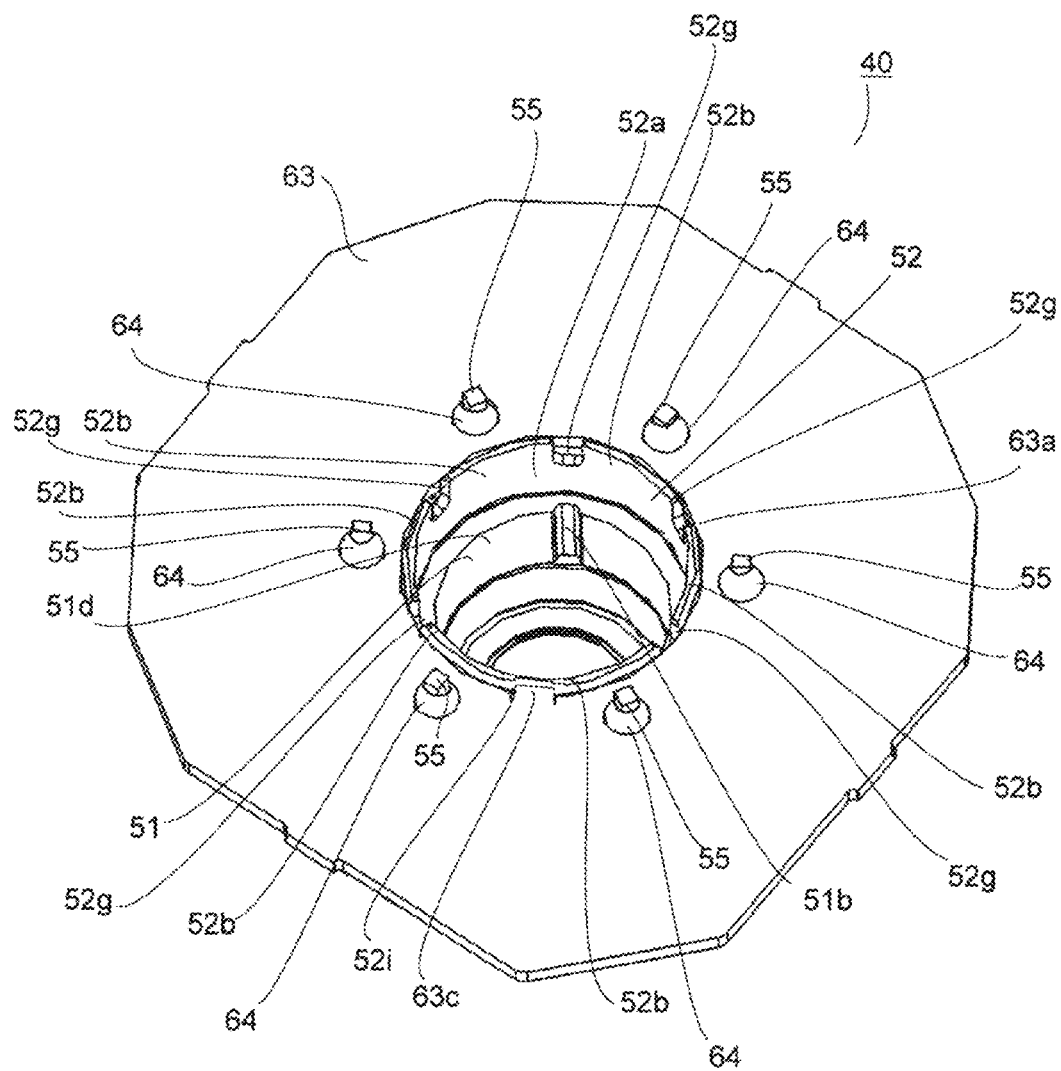
FIG. 8 is a perspective view of the stationary portion of the motor according to a second example embodiment of the present disclosure.

Next, a second example embodiment of the present disclosure will be described. FIG. 8 is a perspective view of the stationary portion 40 of the second example embodiment and shows a state before the bearing housing 61 is fixed to the stator 50. For convenience of explanation, the same reference numerals are given to similar portions as those in the first example embodiment shown in FIGS. 1 to 7 described above. In the second example embodiment, an insulator recess 52i is provided instead of the notch portion 52f.

The insulator recess 52i is formed on the radially outer surface of the wall portion 52b and is recessed radially inward. When the board projecting portion 63c is fitted in the insulator recess 52i, a radially inner end portion of the board projecting portion 63c faces the wall portion 52b in the radial direction. This can prevent the coating agent from flowing into the insertion hole 51a from the upper surface of the board projecting portion 63c.

The above example embodiments are merely examples of the present disclosure. The configuration of the example embodiment may be appropriately changed without departing from the technical idea of the present disclosure. Further, the example embodiments may be implemented in combination within a possible range.

The motor of the present disclosure can be used for, for example, a vehicle-mounted cooling blower.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a stationary portion;
a rotating portion including a shaft that rotates about a central axis extending vertically; and
a bearing portion that rotatably supports the shaft with respect to the stationary portion; wherein
the stationary portion includes:
  a cylindrical bearing housing that holds the bearing portion; and
  a stator radially outward of the bearing housing, and a circuit board above the stator and including an insertion hole to permit insertion of the bearing housing;
the stator includes:
  a stator core including an annular core back and a plurality of teeth extending radially outward from the core back and in a circumferential direction;
  an insulator covering at least a portion of the stator core;
  a coil in which a conductive wire is wound around the teeth with the insulator interposed therebetween; and
  a terminal pin connected to the conductive wire, passing through a through-hole in the circuit board to protrude above the circuit board, and connected to the circuit board by a solder portion covered with a coating layer;
the insulator includes:
  a base portion covering at least a portion of an upper portion of the stator core; and
  a wall portion protruding upward from the base portion, radially outward of the bearing housing, and contacting a radially inner surface of the circuit board at the insertion hole;
the wall portion opposes the solder portion in a radial direction;
a width in a circumferential direction of the wall portion is larger than a width in a circumferential direction of the solder portion; and
an upper end of the wall portion is positioned axially above an upper surface of the circuit board.

2. The motor according to claim 1, wherein
the circuit board includes a board projecting portion protruding radially inward from a radially inner surface in the insertion hole;
the wall portion includes a notch portion that is recessed axially downward; and
the board projecting portion is fitted to the notch portion.

3. The motor according to claim 2, wherein a radially inner end of the board projecting portion is at a same position in a radial direction or radially outward with respect to a radially inner surface of the wall portion.

4. The motor according to claim 3, wherein a lower end of the notch portion is located axially below a lower surface of the circuit board.

5. The motor according to claim 1, wherein
the circuit board includes a board projecting portion protruding radially inward from a radially inner surface at the insertion hole;
the wall portion is on a radially outer surface, and includes an insulator recess recessed radially inward; and
the board projecting portion is fitted to the insulator recess.

6. The motor according to claim 1, wherein a total thickness in an axial direction of the coating layer covering a peripheral portion of the solder portion is larger than a total thickness in an axial direction of the coating layer covering a central portion of the solder portion.

7. The motor according to claim 1, wherein
the bearing housing includes a support portion protruding radially outward from a radially outer surface; and
an axially lower surface of the support portion contacts an upper surface of the core back in an axial direction.

8. The motor according to claim 7, wherein a radially outer surface of the support portion contacts a radially inner surface of the wall portion.

9. The motor according to claim 1, wherein
the bearing housing includes a housing projecting portion protruding radially outward from a radially outer surface;
the core back includes a stator recess that is located radially inward of the teeth and recessed radially outward from a radially inner surface of the core back; and
the housing projecting portion is fitted to the stator recess.

10. The motor according to claim 1, wherein an upper portion of the wall portion is divided in a circumferential direction into portions as many as the terminal pins.

11. The motor according to claim 1, wherein the terminal pin is between the teeth that are adjacent each other.

12. A blower comprising:
the motor according to claim 1; and
an impeller that is fixed to the shaft and rotates around a central axis.

\* \* \* \* \*